US012613737B2

(12) United States Patent
Rajadeva et al.

(10) Patent No.: US 12,613,737 B2
(45) Date of Patent: Apr. 28, 2026

(54) RELATIVE DISPLACEABLE CAPACITY INTEGRATION

(71) Applicant: International Business Machines Corporation, Armonk, NY (US)

(72) Inventors: Ahilan Rajadeva, Monroe Township, NJ (US); Constantinos Kassimis, Cary, NC (US); Al Chakra, Apex, NC (US); Chao Jun Wei, Beijing (CN); Yu Zhuo Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 17/487,509

(22) Filed: Sep. 28, 2021

(65) Prior Publication Data

US 2023/0102654 A1 Mar. 30, 2023

(51) Int. Cl.
*G06F 9/48* (2006.01)

(52) U.S. Cl.
CPC .................................. *G06F 9/4881* (2013.01)

(58) Field of Classification Search
CPC ................. G06F 9/4881; G06F 9/5088; G06F 2209/503; G06F 9/505; G06F 2209/508
See application file for complete search history.

(56) References Cited

U.S. PATENT DOCUMENTS

| | | | |
|---|---|---|---|
| 5,974,462 A | 10/1999 | Aman | |
| 6,760,910 B2 | 7/2004 | Eilert | |
| 7,007,276 B1 | 2/2006 | Kubala | |
| 7,051,188 B1 | 5/2006 | Kubala | |
| 7,734,676 B2 | 6/2010 | Dritschler | |
| 10,248,466 B2 | 4/2019 | Chan | |
| 10,705,872 B2 | 7/2020 | Feng | |
| 10,719,354 B2 | 7/2020 | Bhimani | |
| 10,977,086 B2 | 4/2021 | Jha | |
| 2009/0313633 A1* | 12/2009 | Nardelli | G06F 9/505 |
| | | | 703/21 |

(Continued)

FOREIGN PATENT DOCUMENTS

CN 106027643 B 10/2018

OTHER PUBLICATIONS

Anonymous. "[QC201609]A Method for Centrally Managing Data Centers with Container Orchestration During Continuous Cloud Operation." Jan. 20, 2017. 7 pages. Published by IP.com. https://ip.com/IPCOM/000248894.

(Continued)

*Primary Examiner* — Lewis A Bullock, Jr.
*Assistant Examiner* — Carlos Alberto Espana
(74) *Attorney, Agent, or Firm* — Heather Schuler

(57) ABSTRACT

A system may include a memory and a processor in communication with the memory. The processor may be configured to perform operations. The operations may include analyzing a host system, detecting one or more specifications of the host system, and determining a displaceable capacity of the host system. The determining a displaceable capacity of the host system may include identifying a workload on the host system, establishing a workload priority for the workload, and defining a task priority of a task. The operations may include computing service metrics of the host system. The operations may include displacing a portion of the workload using the displaceable capacity.

15 Claims, 6 Drawing Sheets

<u>300</u>

(56) References Cited

U.S. PATENT DOCUMENTS

| | | | | |
|---|---|---|---|---|
| 2011/0247005 A1* | 10/2011 | Benedetti | ............... | G06F 9/5077 |
| | | | | 718/105 |
| 2012/0060171 A1* | 3/2012 | Bobroff | ................. | G06F 9/5077 |
| | | | | 718/105 |
| 2013/0304925 A1* | 11/2013 | Ferris | ................. | G06F 11/3006 |
| | | | | 709/226 |
| 2015/0156080 A1 | 6/2015 | Chakra | | |
| 2018/0365055 A1 | 12/2018 | Bhimani | | |
| 2020/0151018 A1 | 5/2020 | Jha | | |
| 2020/0167197 A1* | 5/2020 | Bahramshahry | .... | H04L 41/5003 |
| 2020/0326982 A1* | 10/2020 | Jha | ........................ | G06F 9/505 |

OTHER PUBLICATIONS

Anonymous. "Pod Priority and Preemption." Aug. 18, 2021. 6 pages. Published by Kubernetes. https://kubernetes.io/docs/concepts/scheduling-eviction/pod-priority-preemption/.

Anonymous. "System and Method for Automatically Leveling Resource Utilization on Kubernetes Cluster." May 7, 2021. 6 pages. Published by IP.com. https://ip.com/IPCOM/000265703.

Cremins, et al., "Telemetry Aware Scheduling (TAS)—Automated Workload Optimization with Kubernetes (K8s*) Technology Guide." Aug. 18, 2021. 11 pages. Published by Intel. https://builders.intel.com/docs/networkbuilders/telemetry-aware-scheduling-automated-workload-optimization-with-kubernetes-k8s-technology-guide.pdf.

Mell, et al., "The NIST Definition of Cloud Computing," Recommendations of the National Institute of Standards and Technology, U.S. Department of Commerce, Special Publication 800-145, Sep. 2011, 7 pgs.

Rodriguez, et al., "Containers Orchestration with Cost-efficient Autoscaling in Cloud Computing Environments." Handbook of research on multimedia cyber security, pp. 190-213, IGI Global, 2020.

Zhong, et al., "A Cost-efficient Container Orchestration Strategy in Kubernetes-based Cloud Computing Infrastructures with Heterogeneous Resources." Apr. 2020. 24 pages. In ACM Transactions on Internet Technology (TOIT) 20, No. 2, 2020, pp. 1-24. Published by ACM. https://doi.org/10.1145/3378447.

* cited by examiner

310  Detect Host System Specifications

320  Determine Relative Displaceable Capacity

330  Calculate Service Metrics

340  Inform Scheduler

350  Displace Relative Displaceable Capacity

360  Deploy Task Workload

300

400

500

RELATIVE DISPLACEABLE CAPACITY INTEGRATION

BACKGROUND

The present disclosure relates to distributed environments and more specifically to orchestration and workload management of a distributed system.

Workload scheduling and workload distribution are common functions in the computer field, including in distributed systems. Distributed systems may include, for example, open-source container systems. Open-source containers offer adaptive load balancing, service registration, deployment, operation, resource scheduling, and capacity scaling. Centralized modules may be used for workload scheduling and distribution.

SUMMARY

Embodiments of the present disclosure include a system, method, and computer program product for orchestration and workload management of a distributed system.

A system in accordance with the present disclosure may include a memory and a processor in communication with the memory. The processor may be configured to perform operations. The operations may include analyzing a host system, detecting one or more specifications of the host system, and determining a displaceable capacity of the host system. The determining a displaceable capacity of the host system may include identifying a workload on the host system, establishing a workload priority for the workload, and defining a task priority of a task. The operations may include computing service metrics of the host system. The operations may include displacing a portion of the workload using the displaceable capacity.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
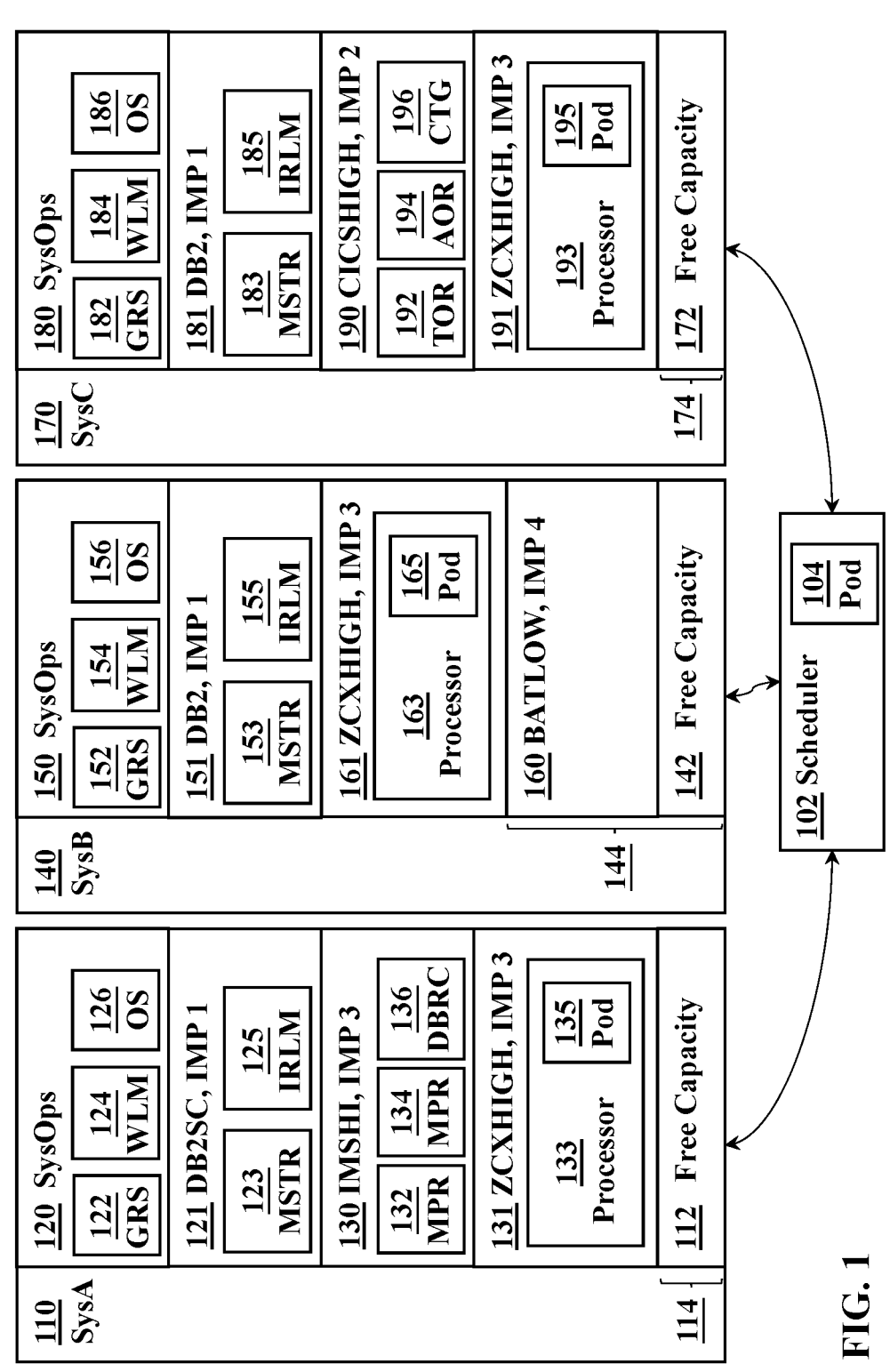
FIG. 1 illustrates a system using displaceable capacity in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributed environments and more specifically to orchestration and workload management of a distributed system.

Container orchestration systems (e.g., open-source container orchestration systems such as a Kubernetes® cluster, which may also be referred to as a k8s® cluster) provide support for automating containerized application deployment, scaling, and management. Containerized applications are typically deployed in a unit referred to as a pod, and a pod may have one or more containers running within it. As part of pod lifecycle management, a container orchestration system provides one or more mechanisms for activating (also referred to as deploying or starting), running, and deactivating (also referred to as stopping) pods. When a pod is activated, all containers within that pod may also be activated; similarly, when a pod stops, all containers within that pod stop.

Container orchestration systems may be used to automate containerized application deployment, scaling, and management of containers in a container runtime environment; a container runtime environment may consist of multiple nodes. Nodes within a cluster may be native to the system, virtualized into the system environment, or some combination thereof.

A scheduler may be responsible for selecting the most suitable node for an incoming workload (e.g., hosting a newly deployed pod). The scheduler may employ scheduling policies to filter nodes based on resource availability; resources may include, for example, processing power, memory, disk space, ports, and the like. The scheduler may employ scheduling policy constraints; such constraints may include, for example, affinity and anti-affinity specifications, data locality, inter-workload interferences, and the like.

When assigning workloads, container orchestration system schedulers may consider various factors such as the fixed number of virtualized environment resources (e.g., available computation power and memory) allocated to a particular instance as well as the current utilization factor of the instance. However, schedulers may not consider underlying host environment capabilities and uses such as, for example, host resource utilization, priority of workloads currently running on the host, and business and service goals.

A decision about assigning workloads may be reached considering additional factors. Dynamic management may enable more efficient use of resources within the container system. For example, resources in a virtual environment may be over-committed to a particular node and may be dynamically managed based on business decisions, service goals, priorities, and the like.

The present disclosure considers the optimization of scheduling container workloads into nodes hosted in virtual environments with co-resident workloads of various levels of priority sharing the same computing resources. Such optimizations may provide insights into selecting an optimal node. Such optimizations may further enable meeting the service level agreement (SLA) objectives associated with the containerized workloads by considering the resources of lower priority workloads running in these virtual environments which may be delayed for higher priority workloads in addition to readily available resources on each node.

A container orchestration framework may have more accurate and flexible pod scheduling and/or scaling abilities in a virtualized environment. The present disclosure may utilize such accuracy and/or flexibility to optimize node usage. In some embodiments, an extend host environment (e.g., z/OS) workload manager (WLM), quality of service (QoS), and dynamic workload management capabilities may be used to support to support containerized workload deployments (e.g., a zCX container extension).

In scenarios with constrained computation power, the present disclosure may enable the highest priority workloads to meet SLA objectives by enabling scheduling the higher priority workloads on systems computing lower priority workloads. In some embodiments, overall business requirements and SLA objectives may be achieved using composite solutions (e.g., z/OS traditional workloads and zCX containerized workloads).

In some embodiments, a new node agent (e.g., kubelet) interface may be used to detect and communicate with an underlying host system (e.g., z/OS) in a virtualized environment (e.g., zCX). Existing host services (e.g., IWM4SRSC service) may be used to gather service metrics to determine the relative displaceable capacity for the instances (e.g., the zCX instances).

Displaceable capacity may be defined as:

$$C_{D,i} = C_F + \sum_{j=i+1}^{l} C_{U,j}$$

wherein $C_{D,i}$ is the displaceable capacity, $C_F$ is the free capacity, $C_{U,j}$ is the used capacity, and l is the number of priority levels.

Workloads may be prioritized into a number of priority levels. In some embodiments, work may be prioritized into six levels of priority such that a level six priority workload takes priority over all tasks with a priority of level five priority or less and a level one priority workload may be the first workload displaced to make resources available for a pending workload of a higher priority. In such an embodiment, the relative displaceable capacity for a pending level six priority workload would include all of the free capacity in the system plus all of the capacity used for workloads of priority five or less. Similarly, the relative displaceable capacity for a pending level four priority workload would include all of the free capacity in the system plus all of the capacity used for workloads of priority three or less. The relativeness of the displaceable capacity depends on the priority of the workload pending deployment.

The metrics gathered by the services (which may be referred to as service metrics, e.g., IWM4SRSC metrics) may be transformed and normalized according to any mechanism known in the art. In some embodiments, the metrics may be normalized on a scale of 0-64. The normalized metrics may be submitted to a scheduler and used in the scheduling algorithm to enhance decisions regarding workload placements (e.g., deployment of new pods). The scheduler may place a new workload request in an optimal virtualized environment (e.g., an optimal zCX instance) on the system (e.g., the z/OS system) to achieve business and service goals.

In some embodiments, a metric is an indicator that may be returned by a service (e.g., the IWM4SRSC) and can be used for load balancing. Load balancing may be done by comparing the metric to calls of the same service against one or more other servers. A metric may incorporate various factors. The factors may include, for example, the available and displaceable computing capacity for an instance (e.g., a zCX instance). This may include the computing capacity on this host not currently being utilized as well as the capacity displaceable for the workload (e.g., the computing power in use by lower priority workloads in the system).

The factors may include, for example, varying numbers of processors, processor variances (e.g., computation power and speed), computing capacity, the performance of an individual instance, and the service class goals of the instance. A WLM may ensure computing capacity metrics are normalized for direct comparison across instances running on any system in the cluster; the WLM may use such factors to ensure that the relative metric of computing capacity returned is consistent across the entire cluster. If an instance is not meeting its goals, the metric may be reduced because adding additional workload to the instance may result in poor performance and/or delay in achieving one or more goals.

A system (e.g., a distributed system such as an open-source container system) in accordance with the present disclosure may implement a variety of tools, techniques, equipment, and operations. Such a system may include, for example, a virtual machine (VM), a virtual server (VS) such as a managed virtual server (MVS), an instance (e.g., a VM, cluster, sysplex, node, pod, and the like), a task control block (TCB), a service level agreement (SLA), a workload manager (WLM), and intelligent workload manager (IWM), a sysplex routing service (SRS), an intelligent workload management for sysplex routing service capacity (IWM4SRSC) service, a global resource serialization (GRS), an operating system (OS), an internal resource lock manager (IRLM), a system and/or subsystem (e.g., z14™ and z15™), a service and/or workload (e.g., MSTR, BATLOW, DB2SC, DB2®, IMSHI, ZCXHIGH, CICSHIGH, MPR, DBRC, AOR, TOR, CTG, pods running services and tasks, and the like), an interface message processor (IMP), similar mechanisms, multiples thereof, and/or a combination thereof.

In some embodiments, a system in accordance with the present disclosure may have a service or component for gathering, computing, and storing metrics integrated into the interface. For example, a plugin may be incorporated into an existing node agent to enable the node agent to collect and compute metrics, and a control plane may store metric data about the node. In some embodiments, a node may store its own metric data.

The displaceable capacity may be referred to as a relative displaceable capacity to indicate that a workload is displaceable in relation to another task. A workload may be considered displaceable only if a task awaiting resources is of a higher priority. For example, a workload with a moderate priority (e.g., a priority of 3) may be running on a host system; if a task with a low priority (e.g., a priority of 1) may be submitted to the system, the low priority task will wait for resources to become available whereas if a high priority task (e.g., a priority of 5) is submitted to the system, the moderate priority task may be paused such that the computational resources from the moderate priority task may be used for the high priority task. Although the moderate priority workload is objectively displaceable regardless of the priority of the new task submitted to the system, the resources allocated to it will only be re-allocated from the moderate priority workload to the new task if the new task is of a higher priority. Thus, whether the objectively displaceable workload (which is currently consuming resources) is relatively displaceable depends on whether the new task that would use its resources is of a higher priority. In other words, the displaceable capacity is relative to the priority of the new task and the priorities of the active workloads.

A system in accordance with the present disclosure may include a memory and a processor in communication with the memory. The processor may be configured to perform operations. The operations may include analyzing a host system, detecting one or more specifications of the host system, and determining a displaceable capacity of the host system. The determining a displaceable capacity of the host system may include identifying a workload on the host system, establishing a workload priority for the workload, and defining a task priority of a task. The operations may include computing service metrics of the host system. The operations may include displacing a portion of the workload using the displaceable capacity to render an available workspace for the task.

In some embodiments of the present disclosure, the operations may include calculating the host system relative displaceable capacity by summing one or more component displaceable capacities with an available host system capacity. In some embodiments, the operations may further include quantifying the one or more component displaceable capacities; the quantifying the one or more component displaceable capacities may include associating the workload with a component, comparing the workload priority to the task priority, identifying the task priority is greater than the workload priority, and quantitating the workload priority. In some embodiments, the component may be a pod, a node, a cluster, an open-source container, or a sysplex.

In some embodiments of the present disclosure, the operations may include deploying a task workload associated with the task into the available workspace.

In some embodiments of the present disclosure, the operations may include transforming the service metrics and normalizing the service metrics to generate normalized service metrics. In some embodiments, service metrics may be normalized between 0-64. In some embodiments, the operations may further include incorporating the normalized service metrics into a scheduling algorithm and scheduling the task to the host system with the scheduling algorithm.

FIG. 1 illustrates a system 100 using displaceable capacity in accordance with some embodiments of the present disclosure. The system 100 may be, for example, a cluster or other distributed system. The system 100 includes subsystems 110, 140, and 170 and a scheduler 102. A subsystem 110, 140, or 170 may be, for example, a node or a sysplex within a larger cluster. The scheduler 102 has a workload to assign in the form of a pod 104. The scheduler 102 is in communication with the subsystems 110, 140, and 170 to assign the workload to the optimal subsystem 110, 140, or 170 within the system 100.

Each subsystem 110, 140, and 170 runs various workloads. The workloads of the first subsystem 110 include system operations 120, DB2SC 121, IMSHI 130, and zCXHIGH 131. The system operations 120 includes a GRS 122, a WLM 124, and an OS 126. The DB2SC 121 segment of the subsystem 110 includes MSTR 123 and IRLM 125. The IMSHI 130 segment of the subsystem 110 includes MPR 132 and 134 and DBRC 136. The zCXHIGH 131 segment of the subsystem 110 includes a processor 133 running a pod 135. The first subsystem 110 also includes free capacity 112 available for use.

The workloads of the second subsystem 140 include system operations 150, DB2 151, zCXHIGH 151, and BATLOW 160. The system operations 150 includes a GRS 152, a WLM 154, and an OS 156. The DB2 151 segment of the subsystem 140 includes MSTR 153 and IRLM 155. The zCXHIGH 161 segment of the subsystem 140 includes a processor 163 running a pod 165. The second subsystem 140 also includes free capacity 142 available for use.

The workloads of the third subsystem 170 include system operations 180, DB2SC 181, CICSHIGH 190, and zCXHIGH 191. The system operations 180 includes a GRS 182, a WLM 184, and an OS 186. The DB2SC 181 segment of the subsystem 170 includes MSTR 183 and IRLM 185. The CICSHIGH 190 segment of the subsystem 170 includes TOR 192, AOR 194, and CTG 196. The zCXHIGH 191 segment of the subsystem 170 includes a processor 193 running a pod 195. The third subsystem 170 also includes free capacity 172 available for use.

The scheduler 102 has a workload to deploy in the form of a pod 104. If the free capacity 112, 142, or 172 in any of the subsystems 110, 140, or 170 can support the workload of the pod 104, the scheduler 102 may assign the pod 104 directly to the relevant subsystem 110, 140, or 170. If the free capacity 112, 142, or 172 in any of the subsystems 110, 140, or 170 is unable to support the workload of the pod 104, the scheduler 102 may identify any displaceable capacity within the system 100.

The displaceable capacity of the system 100 includes component displaceable capacity 114, 144, and 174 in each subsystem 110, 140, and 170. Each component displaceable capacity 114, 144, and 174 includes the free capacity 112, 142, and 172 in each subsystem 110, 140, and 170 as well as any workload in the system 100 with a lower priority than the workload to be deployed. In FIG. 1, the pod 104 to be deployed has a higher priority than the BATLOW 160 process in the second subsystem 140; the resources allocated to the BATLOW 160 process is included in the component displaceable capacity 144 such that the BATLOW 160 process may be displaced (e.g., paused) to ensure the pod 104 is run.

The scheduler 102 may assign the pod 104 to use any resources of a displaceable capacity. The scheduler 102 may prioritize assigning the pod 104 to free capacity 112, 142, or 172 in the system 100 because it is already available and, as such, does not require delaying other workloads to utilize. The free capacity 112, 142, or 172 in a subsystem 110, 140, or 170 may or may not include substantial enough resources for the workload of the pod 104.

To assign the pod 104, the scheduler 102 may displace the BATLOW 160 workload if the pod 104 workload is of a higher priority than the BATLOW 160 workload, as shown in FIG. 1. Displacing the BATLOW 160 may include, for example, pausing, stopping, or re-allocating (e.g., moving to a different host) the BATLOW 160 workload. For example, the BATLOW 160 workload may be paused and/or canceled to await re-deployment and the pod 140 will be allocated the component displaceable capacity 144 of the second subsystem 140.

The present disclosure considers that the sum of the free capacity 112, 142, and 172 may be able to support the additional workload if the current workloads are optimally allocated such that the available resources in a distributed system are aggregated into one component. In such a case, the scheduler 102 may re-assign one or more active workloads to enable placement of the pod 104 while all of the current workloads continue to run.

In some embodiments, the scheduler 102 may consider other variables when assigning a new workload and/or when re-assigning one or more current workloads. In some embodiments, the scheduler 102 may consider variables including, for example, current, pending, and expected workloads, workload priorities, time of resource allocation, overall system resources, workload displaceability, disruption of resource re-allocation, resource expansion availability, expected resource contraction (e.g., scheduled node downtime), and the like.

In some embodiments, in addition to the amount of resources used, the scheduler 102 may also consider the amount of time the workloads will use the allotted resources. For example, the scheduler 102 may identify two workloads awaiting deployment which have the same priority and require the same amount of resources; in some instances, the scheduler 102 may prioritize the workload requiring less time. In other instances, the two workloads may be individual yet codependent such that the results from both workloads must be used simultaneously; in such a circumstance, the scheduler 102 may first prioritize commencing the workload which will take the longer amount of time to complete to minimize the amount of time between the completion of the two tasks and/or the minimization of time until the completion of both tasks.

Figure 2:
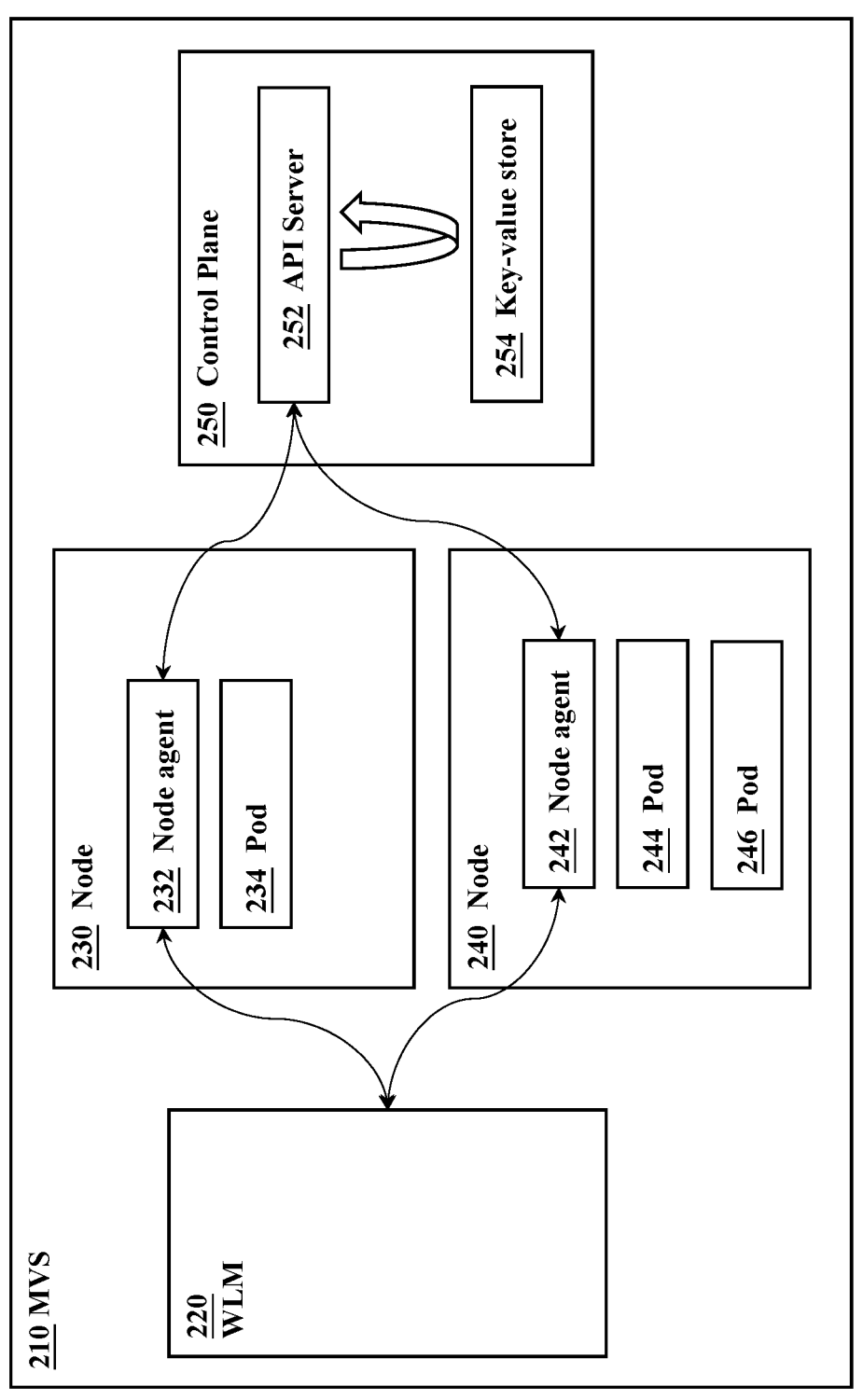
FIG. 2 depicts metric transfer in a system utilizing relative displaceable capacity in accordance with some embodiments of the present disclosure.

FIG. 2 depicts metric transfer in a system 200 utilizing relative displaceable capacity in accordance with some embodiments of the present disclosure. The system 200 includes an MVS 210 with a WLM 220, nodes 230 and 240, and a control plane 250. The nodes 230 and 240 each have node agents 232 and 242 (e.g., kubelets) and host pods 234, 244, and 246. The control plane 250 has an API server 252 and a key-value store 254 (e.g., an etcd). The WLM 220 is in contact with the nodes 230 and 240 via the node agents 232 and 242 (e.g., kubelets). The API server 252 of the control plane 250 is also in contact with the nodes 230 and 240 via the node agents 232 and 242.

In some embodiments of the present disclosure, the node agents 232 and 242 query the WLM 220 for a recommendation. The query from the node agents 232 and 242 may be for a normalized recommendation. The query may be made via a workload management service such as, for example, IWM4SRSC, IWM4QHLT, IWM4MUPD, IWM4MSTR, IWM4MCHS, IWMWQRY, IWMSRSRS, or the like. Such a query may be made periodically; the period may be tuned in accordance with general node agent 232 and 242 tuning. In some embodiments, the period may be approximately ten seconds; in other embodiments, depending on the application and tuning within the system 200, the period may be one minute, five minutes, thirty minutes, an hour, or other denomination thereof.

The node agents 232 or 242 may update the status of its node 230 and 240. The update may refer to the workload information of the node 230 or 240 (e.g., the resources allocated, the resources used, and/or the length of time the resources will be in use) and/or include the WLM 220 recommendation (e.g., a normalized WLM 220 recommendation) or otherwise include information gathered from the control plane 250 (e.g., pending workloads scheduled for assignment to the node 230 or 240).

The node agent 232 or 242 may communicate with the API server 252. The API server 252 may query a node 230 or 240 for its status via its node agent 232 or 242 and save the recommendation from the WLM 220 in a key-value store 254 in the control plane 250. The control plane 250 may use the data stored in the key-value store 254 when scheduling workloads to the nodes 230 and 240 or other workload hosts in the system 200.

In accordance with the present disclosure, the control plane 250 may receive and schedule a new workload in accordance with the data stored in the key-value store 254.

The control plane 250 may identify that a node 230 has the resources available to host the new workload, that a node 240 has a workload of a lower priority than the new workload (and may thus be displaced for the new workload), that there is no available capacity and that the workloads currently running have a higher priority than the new workload, or some combination thereof. For example, a first node 230 may have available resources (e.g., free capacity 112 in FIG. 1) inadequate to accommodate the new workload but sufficient for the workload of a pod 246 in a second node 240 in the system 200; the control plane 250 may identify that the second node 240 will have sufficient resources for the new workload if the pod 246 is no longer using node 240 resources, reallocate the pod 246 to the first node 230, and assign the new workload to the second node 240. Thus, all workloads are allocated with appropriate resources.

In another example, the system 200 may not have resources available to accommodate all workloads. The control plane 250 may identify a pod 246 is running a lower priority workload than the new workload, pause the pod 246, and use those resources to deploy the new workload.

A computer-implemented method in accordance with the present disclosure may include detecting one or more specifications of a host system and determining a displaceable capacity of the host system. Determining the displaceable capacity may include identifying a workload on the host system, establishing a workload priority for the workload, and defining a task priority of a task. The method may include computing service metrics of the host system, including a host system displaceable capacity and displacing a portion of the displaceable capacity to render an available workspace. In some embodiments of the present disclosure, the method may include deploying a task workload into the available workspace.

In some embodiments of the present disclosure, the method may include calculating the host system displaceable capacity by summing one or more component displaceable capacities with an available host system capacity. In some embodiments, the method may further include quantifying one or more component displaceable capacities. A component displaceable capacity may be quantified by associating the workload with a component, comparing the workload priority to the task priority, identifying the task priority is greater than the workload priority, and quantitating the workload priority. In some embodiments, the component may be a pod, a node, a cluster, an open-source container, or a sysplex.

In some embodiments of the present disclosure, the method may include transforming the service metrics and normalizing the service metrics to generate normalized service metrics. In some embodiments, the service metrics may be normalized between 0-64. In some embodiments, the method may further include incorporating the normalized service metrics into a scheduling algorithm and scheduling the task to the host system with the scheduling algorithm.

Figure 3:
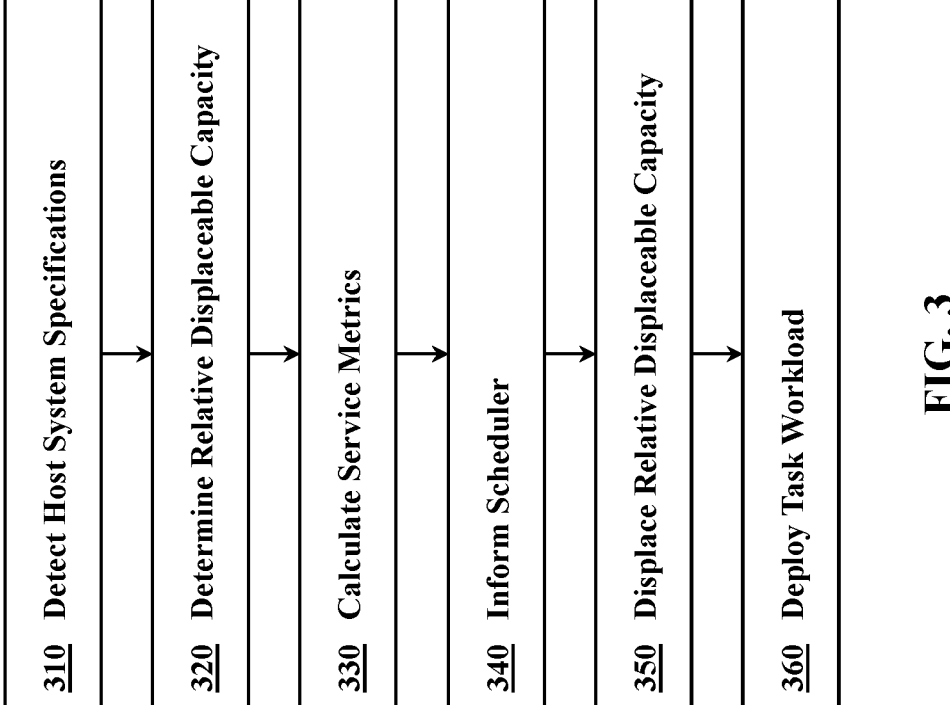
FIG. 3 illustrates a method of integrating displaceable capacity into a system in accordance with some embodiments of the present disclosure.

FIG. 3 illustrates a method 300 of integrating displaceable capacity into a system in accordance with some embodiments of the present disclosure.

The method 300 may include detecting 310 host system specifications. The specifications may include, for example, the overall resources and capacity of the system, the available resources, resources currently in use, the priorities of the workloads currently consuming resources, the ease of pausing and/or transferring workloads, new workloads awaiting deployment, the resources the new workloads require, the resources necessary to optimize the computation of the workloads, and the like. The system may be defined differently in different embodiments of the disclosure; for example, a system may be a cluster, sysplex, VM, or other resource or combination of resources available to a specific entity (e.g., one company, or one user) or for a specific purpose (e.g., for a joint venture of multiple entities, or for a task assigned to a department which has a resource allocation within the resources available to a company).

The method 300 may include determining 320 the relative displaceable capacity within the system. The system specifications may be used to identify available resources, used resources, and the priority of the workloads using the used resources. When a new workload is ready for deployment, the priority of the new workload may be compared to the priority of the workloads currently running (in one or more hosts in the system) to determine which workloads (if any) may be displaced for the new workload. The resources used by any lower priority workloads may be added to the available resources to quantify the relative displaceable capacity in each host.

The method 300 may include calculating 330 the service metrics. Calculating 330 the service metrics may include transforming the service metrics using any transformation technique known in the art and/or normalizing the service metrics using any normalization technique known in the art. In some embodiments, the service metrics will be normalized in a range of 0-64.

The method may include informing 340 the scheduler. Informing 340 the scheduler may include, for example, a node agent (e.g., node agent 232 of FIG. 2) communicating with a scheduler (e.g., scheduler 102 of FIG. 1 or control plane 250 of FIG. 2) about the status of a component in the host system. For example, the host system may be a cluster, the component may be a node, and the status may include information about the node such as the resources allocated to the node, the resources used, and the priorities of the workloads hosted by the node. In some embodiments, the host system may be a sysplex and the component may be a cluster within the sysplex; in some embodiments, the host system may be a server hosting several sysplexes.

The method may include displacing 350 the relative displaceable capacity. If a workload is pending deployment into an at-capacity system, and the pending workload has a higher priority than a workload currently running on the system, the scheduler may displace the currently running workload to make those resources available for the new workload.

The method may include deploying 360 the task workload. The scheduler may deploy the pending workload such that it will use resource capacity in the system that was already free (e.g., idle such that no workload was underway such as free capacity 112 of FIG. 1) or resource capacity that was made available by displacing another workload (e.g., displaceable capacity 114 of FIG. 1 wherein the resources of the BATLOW 160 workload are made available).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
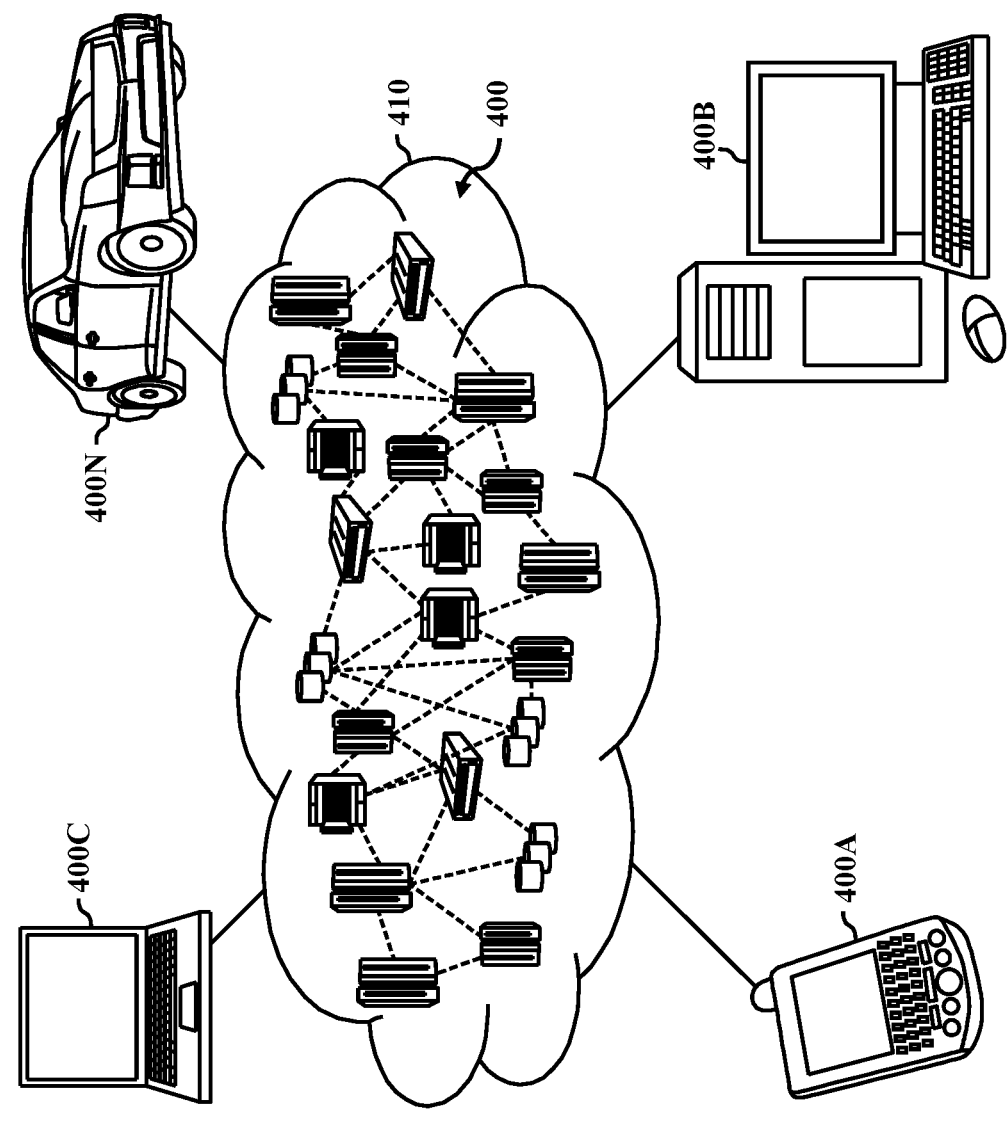
FIG. 4 illustrates a cloud computing environment, in accordance with embodiments of the present disclosure.

FIG. 4 illustrates a cloud computing environment 410 in accordance with embodiments of the present disclosure. As shown, cloud computing environment 410 includes one or more cloud computing nodes 400 with which local computing devices used by cloud consumers such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as private, community, public, or hybrid clouds as described hereinabove, or a combination thereof.

This allows cloud computing environment 410 to offer infrastructure, platforms, and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
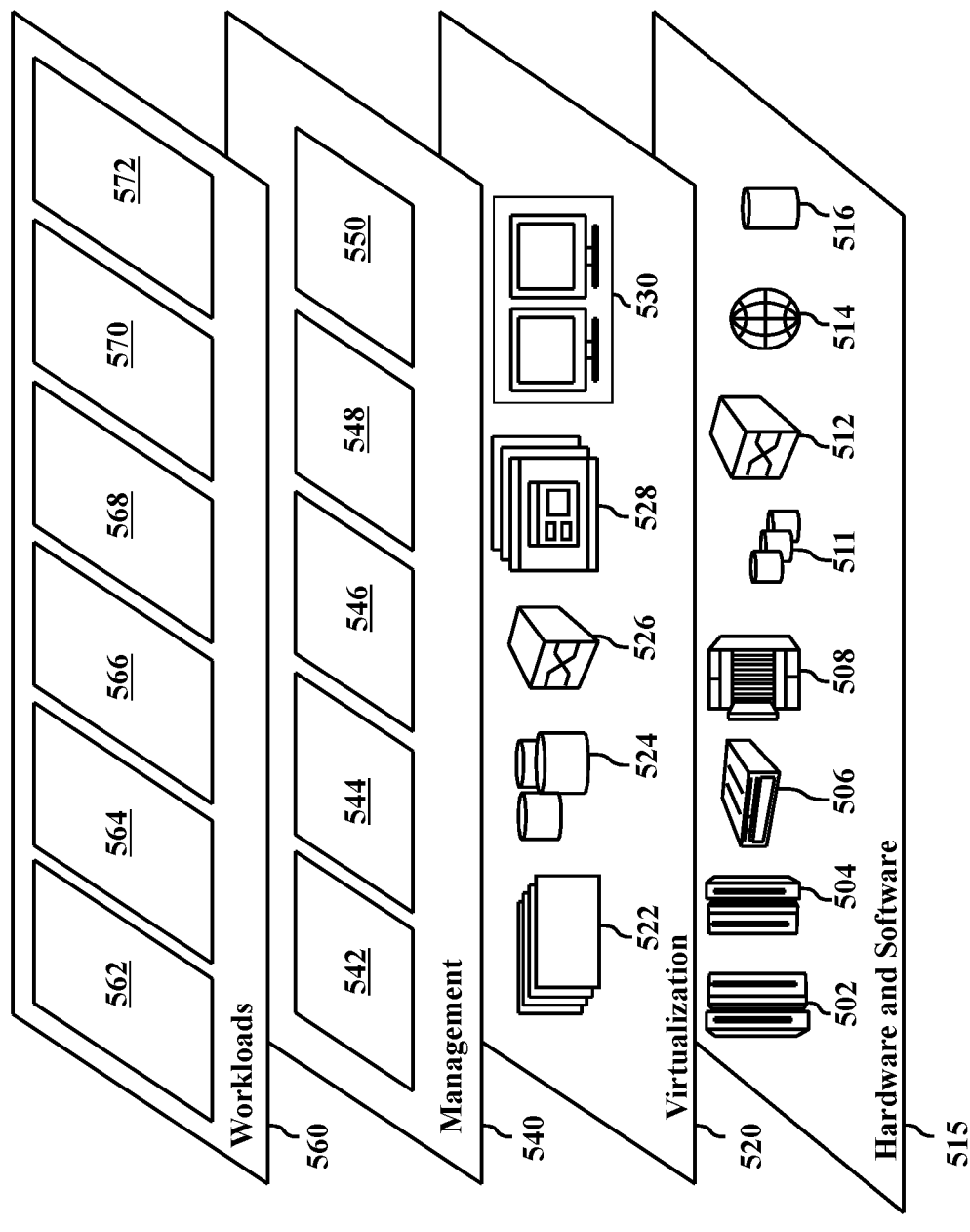
FIG. 5 depicts abstraction model layers, in accordance with embodiments of the present disclosure.

FIG. 5 illustrates abstraction model layers 500 provided by cloud computing environment 410 (FIG. 4) in accordance with embodiments of the present disclosure. It should be understood in advance that the components, layers, and functions shown in FIG. 5 are intended to be illustrative only and embodiments of the disclosure are not limited thereto. As depicted below, the following layers and corresponding functions are provided.

Hardware and software layer 515 includes hardware and software components. Examples of hardware components include: mainframes 502; RISC (Reduced Instruction Set Computer) architecture-based servers 504; servers 506; blade servers 508; storage devices 511; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and pricing 544 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 546 provides access to the cloud computing environment for consumers and system administrators. Service level management 548 provides cloud computing resource allocation and management such that required service levels are met. Service level agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and system displaceable capacity utilization 572.

Figure 6:
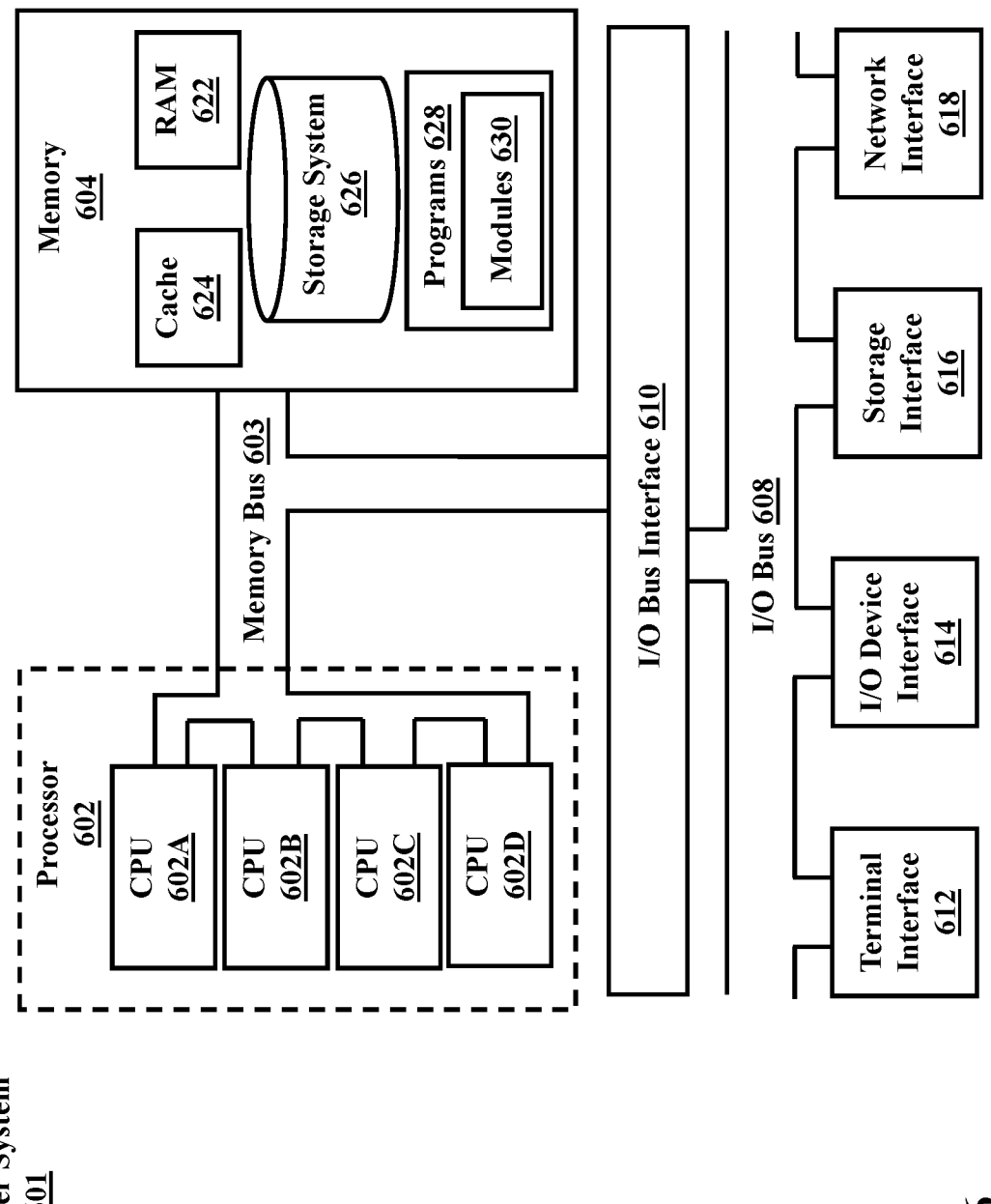
FIG. 6 illustrates a high-level block diagram of an example computer system that may be used in implementing one or more of the methods, tools, and modules, and any related functions, described herein, in accordance with embodiments of the present disclosure.

FIG. 6 illustrates a high-level block diagram of an example computer system 601 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 601 may comprise a processor 602 with one or more central processing units (CPUs) 602A, 602B, 602C, and 602D, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable CPUs 602A, 602B, 602C, and 602D, herein generically referred to as the CPU 602. In some embodiments, the computer system 601 may contain multiple processors typical of a relatively large system; however, in other embodiments, the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630, may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units 610 are shown, which separate the I/O bus 608 from various communications paths running to the various I/O devices, in other embodiments some or all of the I/O devices may be connected directly to one or more system I/O buses 608.

In some embodiments, the computer system 601 may be a multi-user mainframe computer system, a single-user system, a server computer, or similar device that has little or no direct user interface but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
executing a scheduler and an agent;
analyzing, by said agent, a host system;
detecting, by said agent, one or more specifications of said host system;
receiving, by said scheduler, a task for scheduling on said host system, wherein said task has a task priority;
subsequent to said receiving, determining, by said agent, a displaceable capacity for said host system, wherein said displaceable capacity is calculated by summing one or more component displaceable capacities within a host system capacity with a free capacity of said host system, wherein said one or more component displaceable capacities each represent capacity used for a respective workload in said host system, wherein said workloads each have a workload priority, and wherein said task priority is greater than said workload priorities;
displacing, with a scheduler for said host system, a portion of said workloads to make said displaceable capacity used by said portion of said workloads available for said task, wherein said displacing further performs:
based on said determining that said task priority is greater than said workload priorities; and the calculated displaceable capacity for the host system, displacing said portion of said workloads executing on said host system using said displaceable capacity, wherein a scheduler for said host system displaces said portion of said workloads to make said displaceable capacity available for said task by either pausing said portion of said workloads until enough resources for the execution are available, stopping said portion of said workloads, or transferring said portion of said workloads to a different host system; and
executing said task on said host system.

2. The system of claim 1, further comprising: quantifying said one or more component displaceable capacities, wherein said quantifying said one or more component displaceable capacities comprises:
for each of the one or more workloads:
associating said workload with a component;
establishing a component workload priority;
comparing said component workload priority to said task priority;
identifying said task priority is greater than said component workload priority; and
quantitating said component workload priority.

3. The system of claim 2, wherein: said one or more components is selected from the group comprising: a pod, a node, a cluster, an open-source container, or a sysplex.

4. The system of claim 1, further comprising: deploying a task workload associated with said task into an available capacity.

5. The system of claim 1, further comprising: transforming service metrics of said host system; and normalizing said service metrics to generate normalized service metrics.

6. The system of claim 5, further comprising: incorporating said normalized service metrics into a scheduling algorithm; and scheduling, with said scheduling algorithm, said task to said host system.

7. A computer-implemented method, said method comprising:

executing a scheduler and an agent;

analyzing, by said agent, a host system;

detecting, by said agent, one or more specifications of said host system;

receiving, by said scheduler, a task for scheduling on said host system, wherein said task has a task priority;

subsequent to said receiving, determining, by said agent, a displaceable capacity for said host system, wherein said displaceable capacity is calculated by summing one or more component displaceable capacities within a host system capacity with a free capacity of said host system, wherein said one or more component displaceable capacities each represent capacity used for a respective workload in said host system, wherein said workloads each have a workload priority, and wherein said task priority is greater than said workload priorities;

displacing, with a scheduler for said host system, a portion of said workloads to make said displaceable capacity used by said portion of said workloads available for said task, wherein said displacing further performs:

based on said determining that said task priority is greater than said workload priorities; and the calculated displaceable capacity for the host system, displacing said portion of said workloads executing on said host system using said displaceable capacity, wherein a scheduler for said host system displaces said portion of said workloads to make said displaceable capacity available for said task by either pausing said portion of said workloads until enough resources for the execution are available, stopping said portion of said workloads, or transferring said portion of said workloads to a different host system; and executing said task on said host system.

8. The computer-implemented method of claim 7, further comprising: quantifying said one or more component displaceable capacities, wherein said quantifying said one or more component displaceable capacities comprises:

for each of the one or more workloads:

associating said workload with a component;

establishing a component workload priority;

comparing said component workload priority to said task priority;

identifying said task priority is greater than said component workload priority; and quantitating said component workload priority.

9. The computer-implemented method of claim 8, wherein: said one or more components is selected from the group comprising: a pod, a node, a cluster, an open-source container, or a sysplex.

10. The computer-implemented method of claim 7, further comprising:

deploying a task workload associated with said task into an available capacity.

11. The computer-implemented method of claim 7, further comprising:

transforming service metrics of said host system; and normalizing said service metrics to generate normalized service metrics.

12. The computer-implemented method of claim 11, further comprising: incorporating said normalized service metrics into a scheduling algorithm; and scheduling, with said scheduling algorithm, said task to said host system.

13. A computer program product, said computer program product comprising a computer readable storage medium having program instructions embodied therewith, said program instructions executable by a processor to cause said processor to perform a function, said function comprising:

executing a scheduler and an agent;

analyzing, by said agent, a host system;

detecting, by said agent, one or more specifications of said host system;

receiving, by said scheduler, a task for scheduling on said host system, wherein said task has a task priority;

subsequent to said receiving, determining, by said agent, a displaceable capacity for said host system, wherein said displaceable capacity is calculated by summing one or more component displaceable capacities within a host system capacity with a free capacity of said host system, wherein said one or more component displaceable capacities each represent capacity used for a respective workload in said host system, wherein said workloads each have a workload priority, and wherein said task priority is greater than said workload priorities;

displacing, with a scheduler for said host system, a portion of said workloads to make said displaceable capacity used by said portion of said workloads available for said task, wherein said displacing further performs:

based on said determining that said task priority is greater than said workload priorities; and the calculated displaceable capacity for the host system, displacing said portion of said workloads executing on said host system using said displaceable capacity, wherein a scheduler for said host system displaces said portion of said workloads to make said displaceable capacity available for said task by either pausing said portion of said workloads until enough resources for the execution are available, stopping said portion of said workloads, or transferring said portion of said workloads to a different host system; and executing said task on said host system.

14. The computer program product of claim 13, further comprising: quantifying said one or more component displaceable capacities, wherein said quantifying said one or more component displaceable capacities comprises:

for each of the one or more workloads:

associating said workload with a component;

establishing a component workload priority;

comparing said component workload priority to said task priority;

identifying said task priority is greater than said component workload priority; and quantitating said component workload priority.

15. The computer program product of claim 13, further comprising: deploying a task workload associated with said task into an available capacity.

\* \* \* \* \*